United States Patent Office 3,808,209
Patented Apr. 30, 1974

3,808,209
TETRAAMINOPYRAZINE, 2,3,5 - TRIAMINO-6-NITROPYRAZINE, 2,6 - DIAMINO - 3,5-DINITROPYRAZINE
Dennis Scott Donald, Wilmington, Del., assignor to E. I. du Pont de Nemours and Company, Wilmington, Del.
No Drawing. Filed July 14, 1972, Ser. No. 271,938
Int. Cl. C07d 57/76
U.S. Cl. 260—250 R    3 Claims

ABSTRACT OF THE DISCLOSURE

Disclosed herein are 2,6-diamino-3,5-dinitropyrazine, 2,3,5-triamino-6-nitropyrazine, tetraaminopyrazine, as well as processes therefor comprising the nitrative decarboxylation of 2,6-diamino-3,5-dicarboxypyrazine or its sodium salt(s) to make 2,6-diamino-3,5-dinitropyrazine, and its reduction to the triamino- and tetraaminopyrazines. The products are useful as components in thermally stable polymers.

BACKGROUND OF THE INVENTION

(1) Field of the invention

This invention concerns certain novel diamino-, triamino-, and tetraaminopyrazines and imine tautomers thereof.

(2) Description of the prior art 2,6-diaminopyrazine has been prepared by reacting ammonia with the corresponding 2,6-dibromo compound. Starting from tetracyanopyrazine it has also become possible to prepare 2,6-diaminopyrazines with cyano groups or cyano-derived groups at the other (3,5) ring positions as disclosed in my copending and coassigned U.S. patent applications, Ser. Nos. 232,206 filed on Mar. 6, 1972 and now abandoned and 232,207, filed on Mar. 6, 1972.

SUMMARY AND DETAILS OF THE INVENTION

The products of the invention are aminopyrazines having the formula

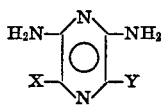

where X and Y, alike or different, are $NH_2$ or $NO_2$. The novel compounds are 2,6-diamino-3,5-dinitropyrazine, 2,3,5-triamino-6-nitropyrazine and tetraaminopyrazine. Also specifically included within the scope of the invention are those tautomeric imine forms of the three cited compounds in which one or both of the nitrogen atoms in the pyrazine ring bear a hydrogen atom otherwise attached to an amino nitrogen not in the ring.

Discussion herein of aminopyrazines is not meant to convey the impression that said amines are present to the exclusion of their tautomeric imine forms. Both amine and imine forms are present in equilibrium. Nor are the processes of this invention to be understood to produce solely amine forms. The processes taught herein produce both amine and imine forms in equilibrium.

The tautomeric forms of the novel compounds of this invention are illustrated by

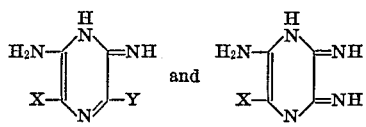

wherein X and Y are as defined above. As will be appreciated by those skilled in the art, the relative proportions of amine and imine can vary dependent upon temperature, solvent, and other effects.

Preparation of 2,6-diamino-3,5-dinitropyrazine

The novel process for making 2,6-diamino-3,5-dinitropyrazine comprises nitrating and decarboxylating 2,6-diamino - 3,5 - dicarboxypyrazine. The expression "nitrating and decarboxylating" as employed herein refers to the (single-step) process of replacing with nitro groups the two carboxy groups in 2,6-diamino-3,5-dicarboxypyrazine. This single-step process is alternatively referred to herein as "nitrative decarboxylation." Both expressions are synonymous.

The nitrative decarboxylation of 2,6-diamino-3,5-dicarboxypyrazine is distinct from the known decarboxylation of pyrazine carboxylic acids in which the leaving carboxy group is replaced by hydrogen. The latter reaction is usually carried out by heating or is catalyzed by dilute acids.

The nitrative decarboxylation used in this invention is carried out by the gradual addition of concentrated nitric acid to a solution of 2,6-diamino-3,5-dicarboxypyrazine in concentrated sulfuric acid. For best results the sulfuric acid solution should be cool, i.e., below room temperature, say, 10° to 15° C. No more than a slight excess over the stoichiometric amount of nitric acid should be used. A large excess should not be used, particularly at higher temperatures, to avoid formation of N-nitro pyrazine amines. Under such controlled conditions good yields of the dinitro compound are obtained.

Alternatively, the monosodium or disoduim salt of 2,6-diamino-3,5-dicarboxypyrazine can be employed as the reactant upon which nitrative decarboxylation is effected to produce the 2,6-diamino-3,5-dinitropyrazine. The 2,6-diamino-3,5-dicarboxypyrazine can be isolated directly in the form of its salts for subsequent conversion to 2,6-diamino-3,5-dinitropyrazine. For example, either the mono- or disodium salt can be obtained by neutralizing the diacid with one or two equivalents, respectively, of sodium hydroxide. Alternatively, the disodium salt can be isolated directly from the basic medium present in the sodium hydroxide hydrolysis of 2,6-diamino-3,5-dicyanopyrazine. The monosodium salt is then obtained by neutralization with one equivalent of acid. These salts offer the advantage of ease of purification relative to the free diacid due to their greater solubility in, and recrystallizability from, water. For further details concerning starting reactants, see the section "Preparation of Starting Materials," set out before Examples 1 to 5 herein.

Preparation of 2,3,5-triamino-6-nitropyrazine and tetraaminopyrazine

The triamino- and tetraaminopyrazines are made by reducing 2,6-diamino-3,5-dinitropyrazine. The two nitro groups in 2,6-diamino-3,5-dinitropyrazine have different susceptibilities to reduction. The nitrotriamine first formed is a red solid scarcely soluble in water. Prolonged reduction or more drastic reaction conditions transform the red nitrotriamine to the tetraamine which gives a blue fluorescent water solution. Either catalytic hydrogenation or chemical reactants can be used to reduce the dinitro compound. Acidic solutions should be avoided to forestall the possible acid-catalyzed hydrolysis of the amine groups. Sodium sulfide is an effective reducing agent. Platinum oxide or palladium on charcoal are effective catalysts for hydrogenation. Other reducing agents and reducing conditions will be obvious to those skilled in the art from a reading of this disclosure.

Tetraaminopyrazine undergoes the reactions characteristic of an aromatic amine. For example, it reacts exothermally with benzoyl chloride in pyridine near room temperature to form the tetraamide, tetrabenzamidoylpyrazine. Similarly it reacts with acetyl chloride, acetic anhydride and thionyl chloride. The aminopyrazines of this invention are generally more oxidatively stable than the analogous amines of the aromatic carbocyclic series. However, the aminopyrazines and especially the tetraaminopyrazines should be handled in an inert atmosphere if even trace decomposition is to be avoided. Such careful handling is desirable when they are being used in Polymerizatiin reactions.

With polyfunctional acidic reactants either condensed ring compounds or polymers can be built up. With phthalic anhydride for example compounds such as

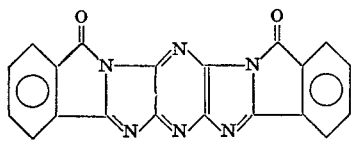

can be formed while with terephthalic acid a variety of polymerization sequences are possible.

UTILITY

Polymer formation

The compounds of this invention are useful intermediates for the preparation of polymers (including copolymers), particularly for the preparation of polymers which are substantially free of hydrogen, capable of being formed by conventional means into self-supporting films, and desirable for high temperature applications.

The amino group substituents on the pyrazine ring provide sites for condensation polymerization with acid comonomers. The doubly difunctional tetraaminopyrazine provides a novel and convenient starting point for the production of ladder polymers which are especially desired for their promising resistance to thermal degradation. The possibilities which a tetraaminopyrazine monomer provides may be readily appreciated from the discussion of "Ladder Polymers" by Overberger and Moore in Advances in Polymer Science, vol. 17, pp. 113–150 (1970) and from the discussion of polyimides having a pyrazine nucleus by Vaughan, Rose and Brown in Journal of Polymer Science, Part A–1, vol. 9, pp. 1117–1138 (1971).

Ladder polymers are made by reaction with tetracarboxylic acids, or dianhydrides such as pyromellitic dianhydride (PMDA)

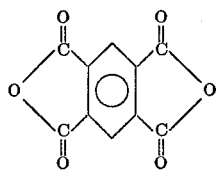

or pyrazinetetracarboxylic and dianhydride (PTDA)

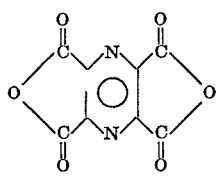

The use of tetraaminopyrazine particularly with PTDA allows the preparation of ladder polymers which are essentially free of hydrogen and thus less susceptible to the mode of thermal decomposition which is initiated by the abscission of hydrogen. Condensation polymerization reactions of this type are preferably carried out in polyphosphoric acid (PPA) by procedures well-known to the art. The increased stability of the pyrazine components relative to their benzene analogues, while advantageous in the final polymer, requires somewhat higher temperatures and longer times for completing polymerization. Temperatures are in degrees C.

UTILITY EXAMPLE A

Polymer from tetraaminopyrazine and pyrazine tetracarboxylic acid dianhydride

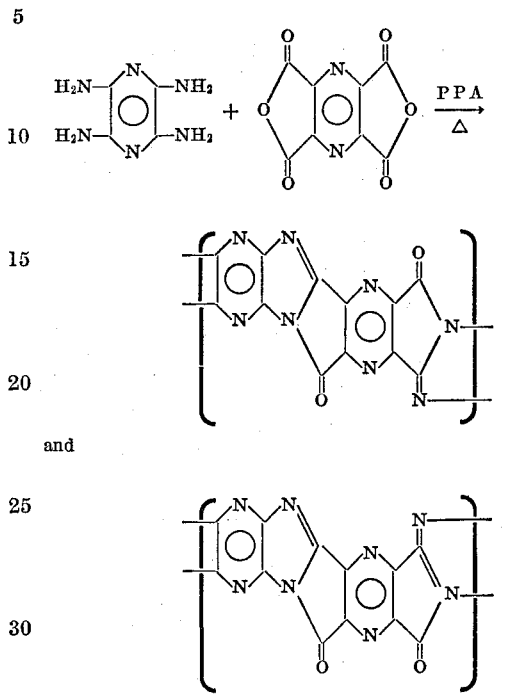

and

Dry nitrogen was passed through 245 ml. of stirred polyphosphoric acid at 110° for 20 hr. To this deoxygenated medium at 110° was added in one portion under a stream of nitrogen 1.40 g. (10 mmol) of tetraaminopyrazine followed by 2.20 g. (10 mmol) of pyrazinetetracarboxylic acid dianhydride. The following heating schedule was followed: 110° to 130° in 1.3 hr.; held at 130–135° for 3 hr.; 135° to 150° in 1 hr.; held at 150° for 3 hr.; 150°–180° in 1.5 hr.; held at 180° for 20 hr. The medium was dark and apparently homogeneous after 0.5 hr. at 110°. The polymer was isolated by slowly pouring the cooled (100°) reaction mixture into about 1 liter of vigorously stirred ice water, and collecting the precipitated solid by filtration. The polymer was washed three times with 200 ml. portions of water and twice with 200 ml. portions of acetone, all washes being carried out in a blender. The glossy black powder was dried to a weight of 1.70 g. at 120° and 0.1 torr over $P_2O_5$ after 20 hr.

The polymer is insoluble in most organic solvents but is soluble in methane sulfonic acid. Solutions containing 10 g. polymer in 100 ml. methane sulfonic acid could be prepared and cast in brittle films or reprecipitated unchanged into methanol to produce the finely divided form suitable for direct, high pressure molding into useful formed articles for high temperature applications such as gears and gaskets.

The inherent viscosity of the polymer at a concentration of 0.1 g./100 ml. in methane sulfonic acid at 25° was 0.24. Thermogravimetric analysis indicated good thermal stability, the 50% weight loss temperatures being 706° and 668° C. in nitrogen and air respectively.

Dyes and Brighteners

The aminopyrazines of this invention can be simply applied from aqueous solutions to improve the appearance of many natural and synthetic fabrics. Aqueous dispersions of the aminonitropyrazines provide a range of yellow-gold dyes for both nylon and wool. Tetraaminopyrazine is an effective fluorescent brightener which is readily adsorbed on a variety of fabrics.

UTILITY EXAMPLE B

Use of tetraaminopyrazine as fluorescent brightener

A 0.1% solution was prepared by dissolving 25 mg. of tetraaminopyrazine, prepared as described in Example 5, in 25 ml. of 2 N hydrochloric acid. A swatch of cloth comprised of many segments from a variety of natural and synthetic fibers was immersed in this solution and swirled occasionally for 15 min., then removed and rinsed in tap water. It was then washed gently with soap, rinsed again and dried overnight. Marked fluorescent brightening was observed on segments comprised of acetate, Arnel®, cellulose triacetate, cotton, nylon, silk and viscose.

UTILITY EXAMPLE C

Aminonitropyrazines as Dyes

The aminonitropyrazines may be applied by the well-known dispersed dye technique. In the present example 250 mg. of the compounds were added in finely divided form to 100 ml. portions of boiling water. A multifiber swatch containing samples of wool, viscose, Verel 75®, silk, Orlon 75®, nylon, Dacron 64®, Dacron 54®, Creslan 61®, cotton, Arnel®, Acrilan 1656® and acetate was swirled in the solution. After 1 hr. at 90°–100° C. the swatch was removed, rinsed well in running water, washed twice with soap and hot water, again rinsed well in running water and air dried.

Results 2,6 - diamino - 3,5 - dinitropyrazine.—This bright yellow compound showed excellent affinity for nylon and wool in the dispersed dye test each being imparted with a bright, pleasing yellow color. Other fibers were dyed to a lesser extent.

2,3,5 - triamino - 6-nitropyrazine.—This dark maroon compound showed excellent affinity for nylon and wool in the dispersed dye test each being dyed a deep, rich gold color. Other fibers were affected to a lesser extent.

DESCRIPTION OF THE PREFERRED EMBODIMENTS

The following examples are meant to illustrate but not to limit this invention. The temperatures are in degrees centigrade.

Preparation of starting materials (A) Tetracyanopyrazine.—Tetracyanopyrazine is disclosed and claimed in coassigned U.S. patent application, Ser. No. 54,617 filed July 13, 1970, in the name of Donald R. Hartter, and can be prepared as follows.

A solution of 152 g. (0.800 mole) of p-toluenesulfonic acid monohydrate in 500 ml. of tetrahydrofuran was added dropwise at room temperature to a stirred solution of 40 g. (0.376 mole) of diiminosuccinonitrile in 600 ml. of tetrahydrofuran (under nitrogen atmosphere; 1.5 hours). Stirring at 25° C. was continued for 2 hours. The precipitated p-toluenesulfonate was then removed by filtering the solution under nitrogen. To the orange-colored filtrate containing oxalyl cyanide was added 20 g. (0.185 mole) of powdered diaminomaleonitrile (15-minute addition) followed by stirring at 45° C. for 3 days. The solution was filtered, removing additional p-toluenesulfonate, and preabsorbed on 150 g. of silica gel which was placed with petroleum ether on 200 g. of additional fresh silica gel in a 4-inch diameter column. Elution with benzene followed by two crystallizations therefrom yielded 8.47 g. (25.4%) of pure tetracyanopyrazine as white leaflets melting at 274–276° C.

(B) 2,6 - diamino - 3,5-dicyanopyrazine.—This compound is disclosed and claimed in my coassigned U.S. patent application, Ser. No. 232,207, filed Mar. 6, 1972, and can be prepared as follows:

To a stirred pool of about 25 ml. of liquid ammonia under nitrogen was added dropwise over a period of 0.5 hour a solution of 10.0 g. (0.0556 mole) of tetracyanopyrazine in 75 ml. of dry tetrahydrofuran. The solution turned deep red with the first drop. After the addition was complete, the solution was stirred under a stream of nitrogen, filtered and washed with fresh tetrahydrofuran to give 4.42 g. of relatively pure 2,6-diamino-3,5-dicyanopyrazine. Evaporation of the filtrate yielded an additional 4.52 g. of slightly less pure product.

Recrystallization from dimethylformamide yielded long, slightly yellow needles containing solvent of crystallization which was removed by heating at 100° C. or higher at 20 mm. Hg for several hours. This material began to darken to a red solid above 200° C. and did not melt below 400° C.

IR spectrum (KBr): $2.89\mu$, $2.97\mu$, $3.07\mu$, $3.14\mu$, $5.98\mu$, $6.10\mu$ (—$NH_2$); $4.48\mu$ (—C≡N); $6.48\mu$ (conjugated C=C and/or C=N).

UV spectrum $$(\lambda_{max.}^{EtOH})$$

354 m$\mu$ ($\epsilon$=16,500), 274 m$\mu$ ($\epsilon$=16,700), 224 m$\mu$ ($\epsilon$=33,600).

Mass spectrum: Molecular ion, measured m/e 160.0494; calcd. m/e 160.0497.

(C) 2,6 - diamino - 3,5 - dicarboxypyrazine.—The hydrolysis of cyanopyrazines is described in my coassigned U.S. patent application Ser. No. 184,578 filed September 28, 1971 now abandoned and can be carried out as follows: Hydrolysis of five grams ($3.13 \times 10^{-2}$ mol) of 2,6-diamino-3,5-dicyanopyrazine was accomplished by heating it in 100 ml. of 5% sodium hydroxide ($12.5 \times 10^{-2}$ mol) solution at reflux for 6 days. The initial vigorous evolution of ammonia had ceased by the end of this time. The hot, slightly yellow slurry was diluted with 300 ml. of hot water and all but a very small amount of material dissolved. After treatment with charcoal and filtration, 25 ml. of concentrated hydrochloric acid was added to the still-warm and vigorously stirred solution. The resulting slurry was cooled well in an ice bath and the product was collected by filtration, washed three times with water, two times with methanol and dried overnight at 100° C. in a vacuum oven (4.70 g., 76% yield).

IR spectrum (KBr): 2.96, 3.05, $3.12\mu$ ($NH_2$), 5.86 (C=O), 6.00, 6.17, 6.45, 6.57, 6.65 (C=O, $NH_2$, C=C, and/or C=N).

UV spectrum $$(\lambda_{max.}^{EtOH})$$

225 nm. (k 140), 277 (k 91.4), 353 (k 88.5).

Mass spectrum: m/e 198 (parent molecular ion), 154 (—$CO_2$), 136 (—$CO_2$, $H_2O$), 110 (base peak, —$2CO_2$).

Analysis.—Calcd. for $C_6H_6O_4N_4$ (percent): C, 36.37; H, 3.05; N, 28.28. Found (percent): C, 35.87; H, 3.04; N, 28.42.

(D) Salts of 2,6 - diamino-3,5-dicarboxypyrazine.—A magnetically stirred slurry of 79.4 g. (0.495 mol) of 2,6-diamino-3,5-dicyanopyrazine in 1600 ml. of water containing 80.0 (2.00 mol) of sodium hydroxide was heated at reflux. After 2.25 hr. a homogeneous solution resulted which was slowly purged with nitrogen with the reaction vessel open to the atmosphere to allow the ammonia and some water to escape. Heating was continued during this time and within 1 hr. the solution had concentrated by about 200 ml. and a solid had begun to form. After an additional 0.75 hr. of heating and purging with nitrogen the slurry was cooled to 0–5° in an ice bath, the copious solid was collected by filtration, washed twice with small portions of cold water and dried at 110° at 300 torr overnight giving 75.8 g. of the hydrate of the disodium salt of 2,6-diamino-3,5-dicarboxypyrazine. Drying for 24 hr. at 110° and 0.1 torr over $P_2O_5$ removed the water of hydration. Recrystallization of 11.3 g. of the hydrate from 150 ml. of water and drying as above gave the pure disodium salt of 2,6-diamino-3,5-dicarboxypyrazine as a pale yellow powder.

IR spectrum (KBr): 2.98μ, 3.06μ and 6.15μ (—NH$_2$). 6.37μ and 7.20μ

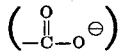

6.51μ and 6.69μ (conjugated, cycle —C=C— and/or —C=N).

UV spectrum ($\lambda_{max.}^{H_2O}$)

353 mμ (ε=15,900); 277 mμ (ε=16,100); 215 mμ (ε=25,200).

Analysis.—Calcd for C$_6$H$_6$O$_5$N$_4$Na$_2$ (percent): C, 29.76; H, 1.66; N, 23.14. Found (percent): C, 30.02, 29.86; H, 2.06, 2.07; N, 22.77, 22.94.

The monosodium salt of 2,6-diamino-3,5-dicarboxypyrazine was prepared by careful addition of one equivalent of 2 N hydrochloric acid to a 0.1 M aqueous solution of the disodium salt. The monosodium salt precipitated in 92% yield.

IR spectrum (KBr): 2.93μ, 3.00μ (—NH$_2$); broad, weak 4.0μ band associated with —OH; 5.94μ (acid >C=O); 6.30μ and 7.25μ

6.50μ shoulder and 6.75μ (conjugated, cyclic —C=C— and/or —C=H—).

UV spectrum ($\lambda_{max.}^{H_2O}$)

354 mμ (ε=15,300); 278 mμ (ε=15,500); 220 mμ (ε=24,800).

Analysis.—Calcd. for C$_6$H$_5$O$_4$N$_4$Na (percent): C, 32.74; H, 2.29; N, 25.46. Found (percent): C, 32.64; H, 2.28; N, 25.53.

EXAMPLE 1

Preparation of 2,6-diamino-3,5-dinitropyrazine

A 4.70 g. (2.37×10$^{-2}$ mol) sample of 2,6-diamino-3,5-dicarboxypyrazine was dissolved in 25 ml. of concentrated sulfuric acid and the dark solution was cooled to 10° C. in an ice bath. The dropwise addition of a solution of 3.00 ml. of nitric acid and 3 ml. of sulfuric acid to the stirred solution was begun with the temperature at 12° C. After 10 minutes, 2 ml. of the solution had been added and vigorous gas evolution had begun. The temperature was maintained between 10° C. and 15° C. and the addition was complete after an additional 30 minutes. Stirring at 12° C. was continued for 45 minutes during which time the gas evolution virtually ceased. The gas evolution increased as the reaction mixture was allowed to warm slowly at 24° over the next 45 minutes. After 30 minutes at 24° the evolution of gas had completely subsided. After an additional hour the reaction mixture was poured into 500 ml. of ice water and the precipitated solid was collected by filtration, washed with water, 10% sodium bicarbonate, water and finally methanol. After drying there was obtained 3.98 g. (84% yield) of 2,6-diamino-3,5-dinitropyrazine as a fine yellow powder whose infrared spectrum is virtually unchanged by recrystallization. Recrystallization of 3.80 g. of the crude product from 400 ml. of 1:1 dimethylsulfoxide/H$_2$O gave a 2.48 g. first crop as small yellow crystals, which begin to darken at 300° and decompose with gas evolution at 356° C. in a sealed tube.

IR spectrum (KBr): 2.88μ, 2.97μ and 3.01μ (—NH$_2$); 6.42μ and 7.58μ (—NO$_2$); 6.07μ, 6.15μ and 6.69μ (—NH$_2$, C=C, and/or C=N).

UV spectrum ($\lambda_{max.}^{EtOH}$)

305 mμ (ε=16,400); 313 mμ (ε=15,000); shoulder 260 mμ (ε=11,300); 244 mμ (ε=15,500).

Mass spectrum: molecular ion, calculated for C$_4$H$_4$N$_6$O$_4$, m/e, 200.0294; measured m/e, 200.0314.

Analysis.—Calcd. for C$_4$H$_4$N$_6$O$_4$ (percent): C, 24.01; H, 2.01; N, 42.00. Found (percent): C, 24.70, 24.66, 24.37; H, 2.01, 1.94, 1.93; N, 41.78, 41.71, 41.48.

EXAMPLE 2

Preparation of 2,6-diamino-3,5-dinitropyrazine from the dicarboxy salt

To a 2 l., 3-necked, round-bottom flask equipped with mechanical stirring, a thermometer, nitrogen inlet and containing 390 ml. of concentrated sulfuric acid at 5° C. was added portionwise 78.4 (0.324 mol) of disodium-3,5-diaminopyrazine-2,6-dicarboxylate at such a rate that the temperature remained below 10° C. The resulting slurry was stirred vigorously as a solution of 54 ml. of concentrated nitric acid in 54 ml. of concentrated sulfuric acid was added dropwise at such a rate that the temperature remained between 15° and 20°. Vigorous carbon dioxide evolution began early in the addition and continued for several hours after the addition was complete. After stirring overnight at ambient temperature the yellow, homogeneous solution was poured onto three liters of ice and the bright yellow solid which formed was collected by filtration, washed with 10% aqueous sodium bicarbonate and water and oven dried at 110° overnight (62.0 g., 95.7% yield). The infrared spectrum of this material is identical with that of the 2,6-diamino-3,5-dinitropyrazine described in Example 1. The entire sample was recrystallized from a mixture of 370 ml. of dimethylsulfoxide and 55 ml. of water yielding 59.6 g. of bright yellow, crystalline material.

Using the monohydrate of disodium-3,5-diaminopyrazine-2,6-dicarboxylate on a 0.210 mol scale under the same conditions as described above, the yield of 2,6-diamino-3,5-dinitropyrazine was 95.4%.

EXAMPLE 3

Preparation of 2,3,5-triamino-6-nitropyrazine

To a yellow solution of 400 mg. (2.0 mmol) of 2,6-diamino-3,5-dinitropyrazine in 25 ml. of dimethylacetamide was added 150 mg. of platinum oxide and the slurry was shaken at room temperature in a hydrogen atmosphere at 50 p.s.i.g. The initial rapid hydrogen uptake was accompanied by the appearance of a red color. Within 5 minutes the hydrogen uptake had virtually stopped and little additional absorption occurred in the next 45 minutes. The catalyst was removed by filtration and was washed with 15 ml. of fresh dimethylacetamide. The clear, red filtrate was diluted with 100 ml. of water and the maroon solid which formed was collected by filtration, washed with water and dried (225 mg., 66% yield). This 2,3-triamino-6-nitropyrazine gives a yellow solution in hot water (only 0.1% soluble) and can be recovered unchanged on cooling. The solid begins to darken at about 260° C. and decomposes with gas evolution at about 300° C. in a sealed tube.

IR spectrum (KBr): 2.94μ, 2.98μ, 3.09μ. 3.14μ (—NH$_2$); 5.96μ, 6.01μ, 6.20μ, 6.74μ (—NH$_2$, C=C and/or C=N); 6.55μ and 7.62μ (—NO$_2$).

UV spectrum ($\lambda_{max.}^{DMF}$)

shoulder 440 mμ (ε=17,000); 280 mμ (ε=10,200). Peaks appear at 438 mμ, 282 mμ and 245 mμ in ethanol.

Mass spectrum: Molecular ion calculated for C$_4$H$_6$N$_6$O$_2$, m/e 170.0552; measured m/e 170.0563.

Analysis.—Calcd. for C$_4$H$_6$N$_6$O$_2$ (percent): C, 28.24; H, 3.55; N, 49.40. Found (percent): C, 28.49, 28.61, 28.85; H, 3.45, 3.53, 3.58; N, 48.31, 48.55, 48.76.

EXAMPLE 4

Preparation of 2,3,5-triamino-6-nitropyrazine

To a slurry of 5.00 g. (0.025 mol) of 2,6-diamino-3,5-dinitropyrazine in 200 ml. of water was added 17.3 g. (0.324 mol) of ammonium chloride and 41.5 g. (0.173 mol) of sodium sulfide monohydrate with vigorous stirring at room temperature. The slurry began to turn red immediately and was dark maroon within 30 minutes. After a total of 2 hours the maroon solid was collected by filtration, washed with water and air dried giving 3.85 g. (90.5% yield) of 2,3,5-triamino-6-nitropyrazine whose infrared spectrum is identical with that described in Example 3. Crystallization of the product from a mixture of 100 ml. of dimethylsulfoxide/50 ml. of water gave 2.73 g. of the product as maroon microcrystals.

Further reduction to tetraaminopyrazine under these conditions was quite slow so that even after 18 hours at reflux about 25% of 2,3,5-triamino-6-nitropyrazine was still unreduced.

EXAMPLE 5

Preparation of tetraaminopyrazine

A nitrogen-purged Parr bottle was charged with 25.0 g. (0.125 mol) of 2,6-diamino-3,5-dinitropyrazine, 2.5 g. of 10% palladium on charcoal and 250 ml. of oxygen-free water and the slurry was shaken on a Parr apparatus at 50 p.s.i.g. hydrogen pressure and room temperature. The theoretical amount of hydrogen was consumed within 16 hours. All subsequent operations were performed in a nitrogen atmosphere. The contents of the bottle were transferred to a flask containing 1250 ml. of boiling, oxygen-free water and the slurry was heated at reflux for 15 minutes and filtered hot. As the intensely blue fluorescent filtrate cooled, long, breeze-colored needles of tetraaminopyrazine formed which were collected by filtration after first cooling the slurry to 0°. After drying for 16 hours over $P_2O_5$ at 0.1 torr there was obtained 14.9 g. (85% yield) of tetraaminopyrazine which slowly decomposed without melting below 360° C. in a sealed tube under nitrogen.

IR spectrum (Nujol): $2.94\mu$, $3.01\mu$, $3.15\mu$, $6.02\mu$, $7.75\mu$, $8.95\mu$, $9.45\mu$.

UV spectrum ($\lambda_{max.}^{H_2O}$)

372 m$\mu$ ($\epsilon$=4,480); 280 m$\mu$ ($\epsilon$=6,320); 243 m$\mu$ ($\epsilon$=6,730).

Mass spectrum: Strong molecular ion m/e 140 as required for $C_4H_8N_6$. A tetra(trimethylsilyl) derivative, calculated for $C_{16}H_{40}N_6Si_4$, 428.2389; observed 428.2362.

*Analysis.*—Calcd. for $C_4H_8N_6$ (percent): C, 34.28; H, 5.75; N, 59.97. Found (percent): C, 34.01, 34.14; H, 5.60, 5.53; N, 59.76, 59.86.

The embodiments of the invention in which an exclusive property or privilege is claimed are defined as follows:

1. 2,6-diamino-3,5-dinitropyrazine.
2. 2,3,5-triamino-6-nitropyrazine.
3. Tetraaminopyrazine.

References Cited

UNITED STATES PATENTS 3,017,412   1/1962   Daglish et al. _____ 260—250 R

NICHOLAS S. RIZZO, Primary Examiner

R. D. McCLOUD, Assistant Examiner

U.S. Cl. X.R.

8—54, 162 R, 168, 178 R, 179; 252—301.2 W; 260—30.8, 32.4, 78 TF